United States Patent
Bhattacharyya et al.

(10) Patent No.: US 9,529,362 B1
(45) Date of Patent: Dec. 27, 2016

(54) AUTONOMOUS AIRCRAFT OPERATING SYSTEM, DEVICE, AND METHOD

(71) Applicant: ROCKWELL COLLINS, INC., Cedar Rapids, IA (US)

(72) Inventors: Siddhartha Bhattacharyya, Cedar Rapids, IA (US); Jennifer A. Davis, Cedar Rapids, IA (US); Thomas L. Vogl, Cedar Rapids, IA (US); Angus L. McLean, Osprey, FL (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 14/711,231

(22) Filed: May 13, 2015

(51) Int. Cl.
*G01C 21/30* (2006.01)
*G06Q 10/06* (2012.01)
*B64C 13/18* (2006.01)
*G05D 1/00* (2006.01)

(52) U.S. Cl.
CPC ............. *G05D 1/0088* (2013.01); *B64C 13/18* (2013.01)

(58) Field of Classification Search
CPC .......... G08G 5/008; G06Q 10/06; G01C 21/30
See application file for complete search history.

(56) References Cited

U.S. PATENT DOCUMENTS

| | | | |
|---|---|---|---|
| 2008/0208468 A1* | 8/2008 | Martin | G01C 21/30 701/469 |
| 2010/0286848 A1* | 11/2010 | Stassen | G08G 5/0008 701/3 |
| 2011/0258021 A1* | 10/2011 | Mumaw | G06Q 10/06 705/7.38 |
| 2013/0091503 A1* | 4/2013 | Painsky | G06F 9/5083 718/100 |
| 2013/0158991 A1* | 6/2013 | Dong | G08G 5/0013 704/235 |

* cited by examiner

*Primary Examiner* — Aaron L Troost
*Assistant Examiner* — Martin Weeks
(74) *Attorney, Agent, or Firm* — Daniel M. Barbieri; Donna P. Suchy; Angel N. Gerdzhikov

(57) ABSTRACT

A system, device, and method for operating an aircraft autonomously are disclosed. The widget creating system may include a plurality of aircraft systems and autonomous pilot processing unit (APPU). The APPU may be configured to acquire first model data representative of either a combined strategic/operational behavior model or an operational behavior model; acquire second model data representative of an execution behavior model; acquire third model data representative of a strategic behavior model when a combined strategic/operational behavior model is not employed; acquire input data representative of at least one aircraft system parameter of each aircraft system of the plurality of aircraft systems, where the input data is acquired through the execution behavior model; monitor each aircraft system of the plurality of aircraft systems for an expected operation; and generate output data representative of at least one command provided to at least one aircraft system of the plurality of aircraft systems.

20 Claims, 5 Drawing Sheets

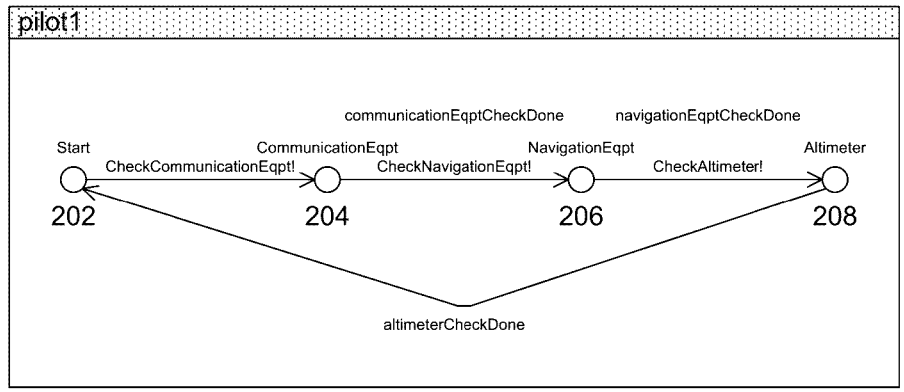
FIG. 2A
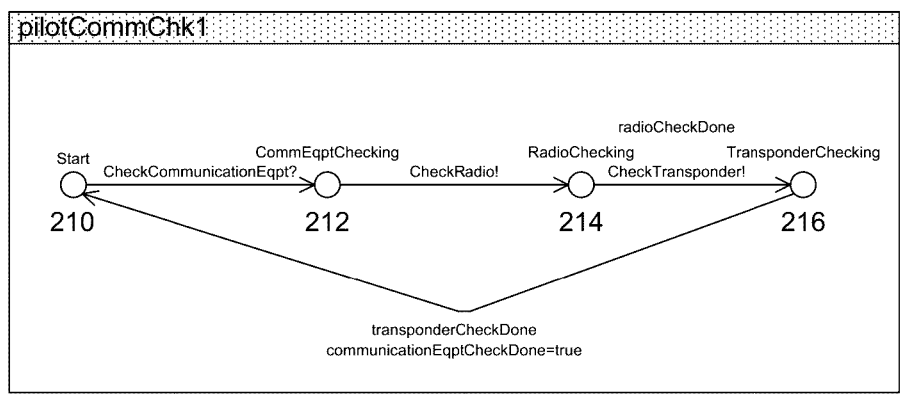
FIG. 2B
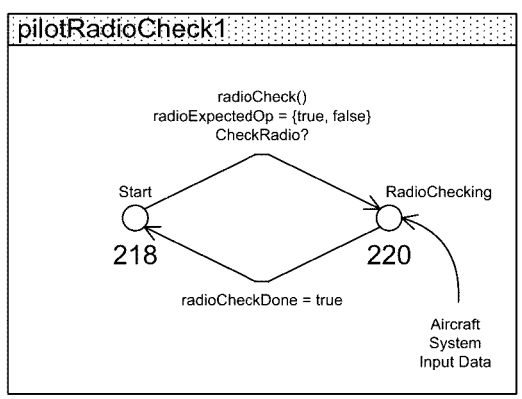 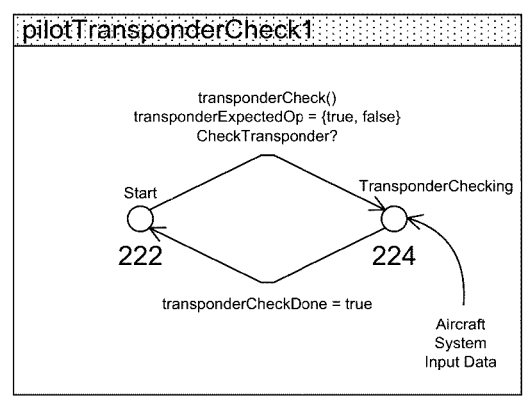
FIG. 2C  FIG. 2D

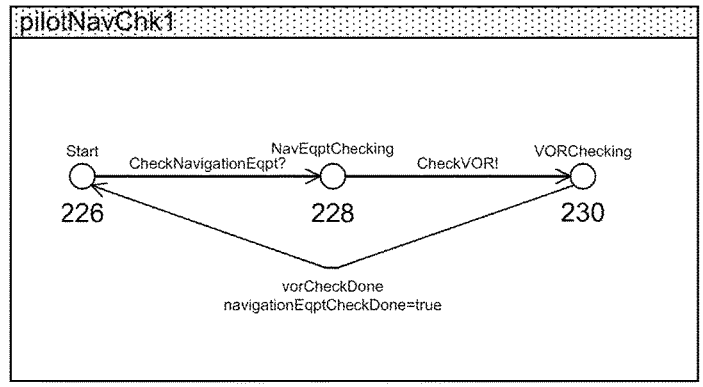
FIG. 2E
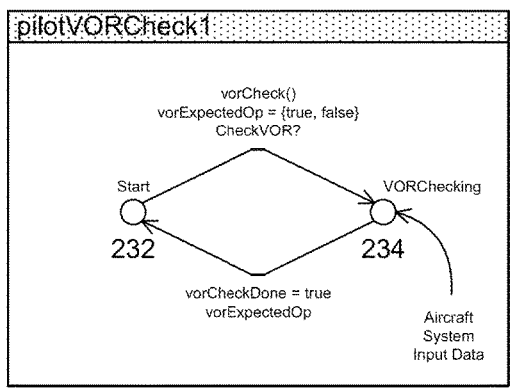 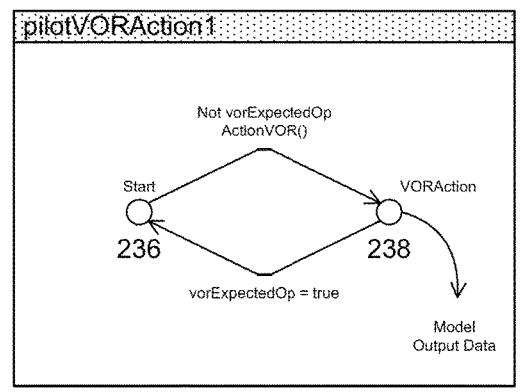
FIG. 2F  FIG. 2G
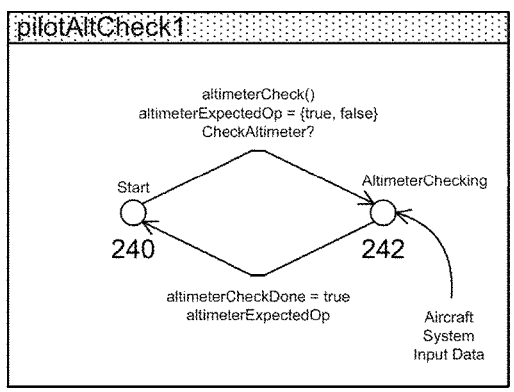 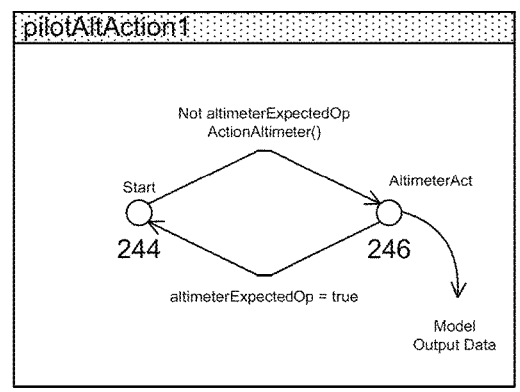
FIG. 2H  FIG. 2I

AUTONOMOUS AIRCRAFT OPERATING SYSTEM, DEVICE, AND METHOD

BACKGROUND

The inventive concepts disclosed herein pertain generally to the field of systems for operating aircraft autonomously.

A flight management system and an autopilot may be employed in conjunction with one another to operate a manned or unmanned aircraft from takeoff to landing. Known to those skilled in the art, these systems are generally operated given a known or approved flight plan connected by a series of waypoints between the departure and destination airports. These systems may relieve the pilot from having to manually fly the aircraft through a control wheel or stick, but their functionality is limited. These systems are unable to interact with or respond to other systems installed on an aircraft and have limited decision-making capability. If one or more components that comprise the flight management system and/or or autopilot fail or in any way become inoperable, these systems are unable to take action to fix themselves and are typically limited to registering and reporting of a fault condition. Although a manual effort could restore these systems to an operable condition, these may not be restorable in the absence of human control.

The autonomous operation of an aircraft could occur when the aircraft receives no manual input and no human decision-making is made in real-time. To enable the autonomous operation of an aircraft, adaptive systems could be employed in an autonomous pilot processing unit, where an adaptive system could be a system that employs an active feedback process that changes in order to maintain expected (or desired) performance, respond to failures, threats, or changing environments.

There exist formal methods for evaluation of these systems that may provide comprehensive information about system execution, represented by formal methods tools. Proofs using formal methods may provide assurance of all possible operations of a system and may be used for software verification. Autonomous behaviors may likewise be mapped to formal methods tools from which they could be verified. Part of the verification process is to determine when outcomes of execution do not fit a desired model, like deterministic or bounded behavior. This information in itself may be useful and may be used as feedback to update the model and make it verifiable.

SUMMARY

Embodiments of the inventive concepts disclosed herein are directed to a system, device, and method for operating an aircraft autonomously without manual input or human decision-making through the employment of an adaptive system and formally verifiable system.

In one aspect, embodiments of the inventive concepts disclosed herein are directed to a system for operating an aircraft autonomously. The autonomous aircraft operating system may include a plurality of aircraft systems and an autonomous pilot processing unit (APPU).

In a further aspect, embodiments of the inventive concepts disclosed herein are directed to a device for operating an aircraft autonomously. The device could be the APPU and may be configured (or programmed) to perform a method of operating an aircraft autonomously. The APPU may acquire first model data representative of a first model; acquire second model data representative of a second model comprised of at least one second parameter; acquire input data representative of at least one aircraft system parameter of each aircraft system of the plurality of aircraft systems; monitor each aircraft system of the plurality of aircraft systems for an expected operation; and generate output data representative of at least one command provided to at least one aircraft system of the plurality of aircraft systems.

In a further aspect, embodiments of the inventive concepts disclosed herein are directed to a method for operating an aircraft autonomously. When configured to carry out the method, the APPU may perform the actions discussed in the preceding paragraph.

BRIEF DESCRIPTION OF THE DRAWINGS

FIG. 2A depicts a module comprised of a strategy behavior model.

FIG. 2B depicts a module comprised of a first operational behavior model.

FIG. 2C depicts a module comprised of a first execution behavior model.

FIG. 2D depicts a module comprised of a second execution behavior model.

FIG. 2E depicts a module comprised of a second operational behavior model.

FIG. 2F depicts a module comprised of a third execution behavior model.

FIG. 2G depicts a module comprised of a fourth execution behavior model.

FIG. 2H depicts a module comprised of a fifth execution behavior model.

FIG. 2I depicts a module comprised of a sixth execution behavior.

DETAILED DESCRIPTION

In the following description, several specific details are presented to provide a thorough understanding of embodiments of the inventive concepts disclosed herein. One skilled in the relevant art will recognize, however, that the inventive concepts disclosed herein can be practiced without one or more of the specific details, or in combination with other components, etc. In other instances, well-known implementations or operations are not shown or described in detail to avoid obscuring aspects of various embodiments of the inventive concepts disclosed herein.

Figure 1:
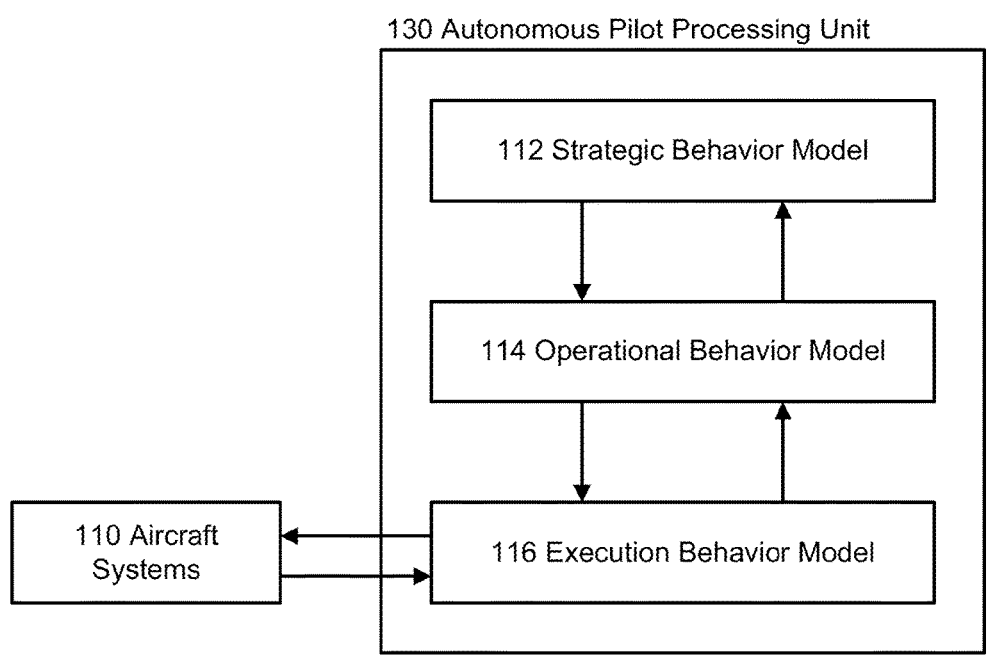
FIG. 1 depicts a block diagram of a system for operating an aircraft autonomously.

FIG. 1 depicts a functional block diagram of a system 100 for operating an aircraft autonomously. The system 100 of FIG. 1 may include aircraft systems 110 and autonomous pilot processing unit (APPU) 120.

Aircraft systems 110 may include one or more systems installed in an aircraft that may be monitored and/or controlled autonomously by the APPU 120 as disclosed below. Aircraft systems 110 could include, but are not limited to, air conditioning, auto flight, communications, electrical power, equipment and furnishings, fire protection, flight controls, fuel, hydraulic power, ice and rain protection, instruments, indicating systems, landing gear, lights, a navigation system (including a flight management system (FMS), traffic collision and avoidance system (TCAS), automatic dependent surveillance-broadcast system (ADS-B), a forward-looking radar system, and terrain awareness and warning system (TAWS), oxygen, pneumatic, vacuum, waste/water, central maintenance system, auxiliary power unit, propellers, main rotor, main rotor drive, tail rotor, tail rotor drive, rotors flight control, propeller/rotor systems, and powerplant systems.

The APPU 120 may include any electronic data processing unit that executes software or source code stored, permanently or temporarily, in a digital memory storage device as discussed above. The APPU 120 may be driven by the execution of software or source code containing algorithms developed for the specific functions embodied herein. Common examples of electronic data processing units are microprocessors, Digital Signal Processors, Programmable Logic Devices, Programmable Gate Arrays, and signal generators; however, for the embodiments herein, the term generator is not limited to such processing units and its meaning is not intended to be construed narrowly. For instance, a processor could also include more than one electronic data processing units. As embodied herein, the APPU 120 could be a processor(s) used by or in conjunction with any other system of the aircraft.

The APPU 120 may be programmed or configured to create a plurality of behavior models. As shown in FIG. 1, the APPU 120 could create a strategic behavior model 112, an operational behavior model 114, and an execution behavior model 116, the interactions of which are disclosed below. In some embodiments, the strategic behavior model 112 and the operational behavior model 114 could be combined into one model such as a combined strategic/operational behavioral model. The APPU 120 may be programmed or configured with functions that enable bi-directional communications between the APPU 120 and the aircraft systems 110. The APPU 120 may be programmed or configured with monitoring functions to acquire as input data representative of real-time system information obtained from the aircraft systems 110. Further, the APPU 120 may be programmed or configured with control functions to generate and provide output data representative of real-time APPU information sent to the aircraft systems 110. As discussed herein, the terms "programmed" and "configured" are synonymous with respect to the execution of software or source code developed for the specific functions and methods embodied herein. The APPU 120 may be electronically coupled to systems and/or sources to facilitate the receipt of input data; as embodied herein, operatively coupled may be considered as interchangeable with electronically coupled. The APPU 120 may be programmed to execute the methods embodied herein and discussed in detail below. The APPU 120 may be electronically coupled to systems and/or units to facilitate the providing of output data representative of a procedure. It is not necessary that a direct connection be made; instead, such receipt of input data and the providing of output data could be provided through a data bus or through a wireless network.

The advantages and benefits of the embodiments disclosed herein may be illustrated by showing how artificial intelligence may be employed by the APPU 120 to operate an aircraft autonomously. Referring to FIG. 2A, a simplified model of an autonomous pilot behavior which may be employed in a physical APPU 120 installed in an actual aircraft is shown in the pilot1 module (or component), where such module and the other modules discussed herein may be created and/or implemented in a formal verification environment, such as the one depicted here, known as UPPAAL. Although the following discussion will be drawn towards the creation of logical behavior models using UPPAAL, the embodiments disclosed herein may be employed in Soar, or one of a plurality of cognitive architectures of artificial intelligence.

Figure 3:
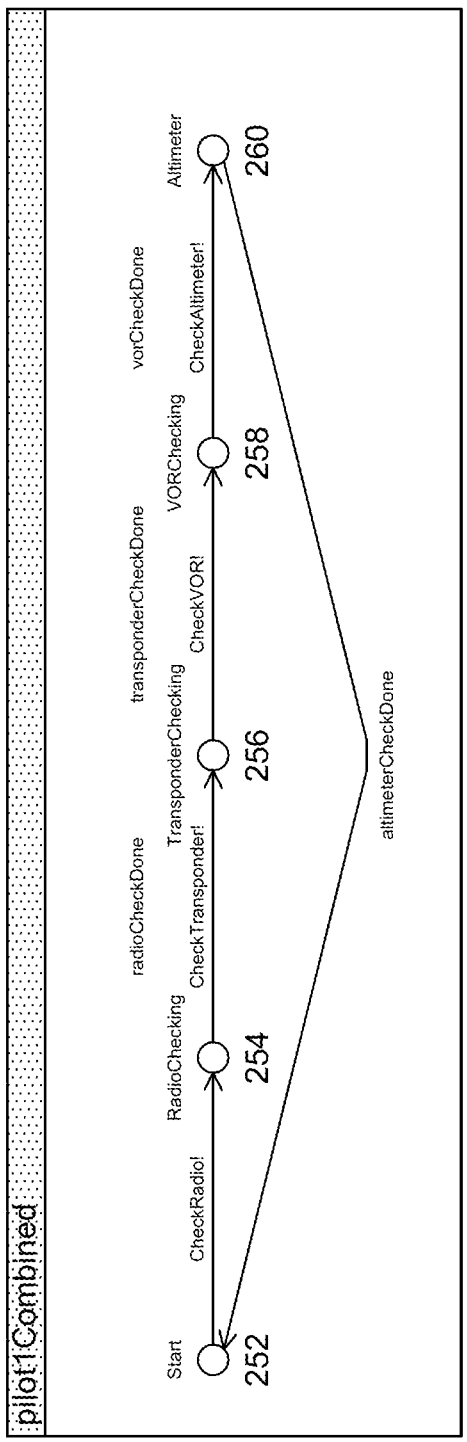
FIG. 3 depicts a module comprised of a combined strategy/operational behavior model.

The following is an example of one of a plurality of autonomous behaviors that could be instantiated and verified within the system 100. For the purpose of illustration and not of limitation, it will be assumed that a hypothetical checklist of a hypothetical aircraft includes check items for which a pilot is expected to check to ensure that operations of communication equipment, navigation equipment, and altimeter in a hypothetical aircraft are operating as expected by the checklist. One instance in which a checklist may be used is when a pilot is being tested under testing standards published by an aviation governing authority; examples of testing standards are the practical test standards published such as the Federal Aviation Administration of the United States. Further, it will be assumed that the hypothetical aircraft includes more than one communication system comprised of a radio and a transponder, navigation system, and altimeter system, and that the models shown in the "pilot1" module of FIG. 2A and the pilot1Combined module of FIG. 3 are drawn towards the checking of equipment in Communication System No. 1 comprised of a Radio System No. 1 and a Transponder System No. 1, Navigation System No. 1 comprised of a VOR System No. 1, and Altimeter System No. 1.

Referring to FIG. 2A, the flow of control of a logical behavior for the checking of aircraft equipment begins at start node 202 at which time pilot1 module sends a CheckCommunicationEqpt command/synchronization event ("event"). The pilotCommChk1 module of FIG. 2B receives the CheckCommunicationEqpt event and responds by transitioning to node 212 as the flow of control is transferred to the pilotCommChk1 module, wherein the global parameters radioCheckDone and transponderCheckDone are set to false. (When an event is sent or received, the syntax presented in the drawings includes an exclamation mark or a question mark, respectively). Then, the pilotCommChk1 module sends a CheckRadio event. The pilotRadioCheck1 module of FIG. 2C receives the CheckRadio event and responds by transitioning to node 220 as the flow of control is transferred to the pilotRadioCheck1 module.

Here, the pilotRadioCheck1 module may look into the aircraft architecture to the Radio System No. 1 and receive input data representative of Radio System No. 1 actual operation. This operation check may be illustrated with the radioCheck( ) function, an exemplary function representing one or more functions that could be defined to simulate one task or many tasks expected of pilot when checking the radio system. This function could update the radioExpectedOp parameter to true or false to indicate whether radio system is operating as expected or not. As disclosed herein, an expected operation of each aircraft system 110 (such as a radio system) may be a checklist-compliant operation, that is, an aircraft system 110 operating in compliance with one or more checklists. In response to the radio system check being performed, a radioCheckDone parameter is set to true and transitions to node 218. Then, the flow of control returns to pilotCommChk1 module of FIG. 2B, waiting at node 214 for the radioCheckDone parameter to be to set to true.

In response to the radioCheckDone parameter being set to true, the flow of control transitions to node 216 with the pilotCommChk1 module sending a CheckTransponder event. The pilotTransponderCheck1 module of FIG. 2D receives the CheckTransponder event and responds by transitioning to node 224 as the flow of control is transferred to the pilotTransponderCheck1 module. Here, the pilotTransponderCheck1 module may look into the aircraft architecture to the Transponder System No. 1 and receive input data representative of Transponder System No. 1 actual operation. This operation check may be illustrated with the transponderCheck( ) function, an exemplary function representing one or more functions that could be defined to simulate one task or many tasks expected of pilot when checking the transponder system. This function could update the transponderExpectedOp parameter to true or false to indicate whether transponder system is operating as expected or not. In response to the transponder system check being performed, a transponderCheckDone parameter is set to true and transitions to node 222. Then, the flow of control returns to pilotCommChk1 module of FIG. 2B, waiting at node 216 for the transponderCheckDone parameter to be to set to true.

In response to the transponderCheckDone parameter being set to true, a communicationEqptCheckDone parameter is set to true, and the flow of control returns to pilot1 module of FIG. 2A, waiting at node 204 for the communicationEqptCheckDone parameter to be to set to true (the flow of control would not proceed until being set to true).

In response to the communicationEqptCheckDone parameter set to true, the pilot1 module sends a CheckNavigationEqpt event. The pilotNavChk1 module of FIG. 2E receives the CheckNavigationEqpt event and responds by transitioning to node 228 as the flow of control is transferred to the pilotNavChk1 module, wherein the global parameter VORCheckDone is set to false. Then, the pilotNavChk1 module sends a CheckVOR event. The pilotVORCheck1 module of FIG. 2F receives the CheckVOR event and responds by transitioning to node 234 as the flow of control is transferred to the pilotVORCheck1 module. Here, the pilotVORCheck1 module may look into the aircraft architecture to the VOR System No. 1 and receive input data representative of VOR System No. 1 actual operation. This operation check may be illustrated with the vorCheck( ) function, an exemplary function representing one or more functions that could be defined to simulate one task or many tasks expected of pilot when checking the VOR system. This function could update the vorExpectedOp parameter to true or false to indicate whether VOR system is operating as expected or not. If the VOR system is not operating as expected, the flow of control is transferred to the pilotVORAction1 module shown in FIG. 2G and responds by transitioning to node 238 as the flow of control is transferred to the pilotVORAction1 module.

Here, the pilotVORAction 1 module may generate output data that may place the VOR System No. 1 into the expected operation. This action may be illustrated with the ActionVOR( ), an exemplary function representing one or more functions that could be defined to simulate one task or many tasks expected of pilot when taking action on the VOR system. In response to the action being performed that places the VOR System No. 1 into expected operation, the vorExpectedOp parameter is set to true and transitions to node 236. In response to the VOR system check being performed, a vorCheckDone parameter shown in FIG. 2F is set to true and transitions to node 232. Then, the flow of control returns to pilotNavChk1 module of FIG. 2E, waiting at node 230 for the VORCheckDone parameter to be to set to true.

In response to the VORCheckDone parameter being set to true, a navigationEqptCheckDone parameter is set to true, and the flow of control returns to pilot1 module of FIG. 2A, waiting at node 206 for the navigationEqptCheckDone parameter to be to set to true (the flow of control would not proceed until being set to true).

In response to the navigationEqptCheckDone parameter set to true, the pilot1 module sends a CheckAltimeter event. The pilotAltCheck1 module of FIG. 2H receives the CheckAltimeter event and responds by transitioning to node 242 as the flow of control is transferred to the pilotAltCheck1 module. Here, the pilotAltCheck1 module may look into the aircraft architecture to the Altimeter System No. 1 and receive input data representative of Altimeter System No. 1 actual operation. This operation check may be illustrated with the altimeterCheck( ) function, an exemplary function representing one or more functions that could be defined to simulate one task or many tasks expected of pilot when checking the altimeter system. This function could update the altimeterExpectedOp parameter to true or false to indicate whether the altimeter system is operating as expected or not.

If the altimeter system is not operating as expected, the flow of control is transferred to the pilotAltAction1 module shown in FIG. 2I and responds by transitioning to node 246 as the flow of control is transferred to the pilotAltAction1 module. Here, the pilotAltAction 1 module may generate output data that may place the Altimeter System No. 1 into the expected operation. This action may be illustrated with the ActionAltimeter( ), an exemplary function representing one or more functions that could be defined to simulate one task or many tasks expected of pilot when taking action on the altimeter system. In response to the action being performed that places the Altimeter System No. 1 into expected operation, the altExpectedOp parameter is set to true and transitions to node 244. In response to the altimeter system check being performed, an altimeterCheckDone parameter shown in FIG. 2H is set to true and transitions to node 240. Then, the flow of control returns to pilot1 module of FIG. 2A, waiting at node 208 for the altimeterCheckDone parameter to be to set to true. In response to the altimeterCheckDone parameter set to true, the flow of control transition to node 202, completing the hypothetical checklist of check items for which a pilot may be expected to, in part, detect defective or inoperative communication equipment, navigation equipment, and altimeter in a hypothetical aircraft through logical behavior defined in three behavior models.

The previous discussion of FIGS. 2A through 2I illustrates a methodical flow of tasks modeling a pilot's performance of the items of a checklist and divided into a plurality of levels. The module of FIG. 2A illustrates a first or top level model that could be a strategy behavior model; the modules of FIGS. 2B and 2E illustrate a second or middle level models that could be operational behavior models; and the modules of FIGS. 2C, 2D, and 2F through 2I illustrate a third or low level models that could be execution behavior models.

In some embodiments, two of these preceding models may be combined into one model. Referring to FIG. 3, the top and middle level models of FIGS. 2A, 2B, and 2E have been combined into one model that is reflected in the pilot1Combined module. In these embodiments, FIG. 3 illustrates a first or top level model that could be a combined strategy/operational behavior model, and FIGS. 2C, 2D, and 2F through 2I illustrate second or low level models that could be execution behavior models.

The flow of control of a logical behavior for the checking of aircraft equipment begins at start node 242 at which time pilot1Combined module sends a CheckRadio event. The pilotRadioCheck1 module of FIG. 2C receives the CheckRadio event and proceeds as discussed above. Once the radio system check has been performed, a radioCheckDone parameter is set to true and transitions to node 218. Then, the flow of control returns to pilot1Combined module of FIG. 3, waiting at node 244 for the radioCheckDone parameter to be to set to true.

In response to the radioCheckDone parameter being set to true, the flow of control transitions to node 246 with the pilot1Combined module sending a CheckTransponder event. The pilotTransponderCheck1 module of FIG. 2D receives the CheckTransponder event and proceeds as discussed above. Once the transponder system check has been performed, a transponderCheckDone parameter is set to true and transitions to node 222. Then, the flow of control returns to pilot1Combined module of FIG. 3, waiting at node 246 for the transponderCheckDone parameter to be to set to true.

In response to the transponderCheckDone parameter being set to true, the flow of control transitions to node 248 with the pilot1Combined module sending a CheckVOR event. The pilotVORCheck1 module of FIG. 2F receives the CheckVOR event and proceeds as discussed above. Once the VOR system check has been performed, a vorCheckDone parameter is set to true and transitions to node 232. Then, the flow of control returns to pilot1Combined module of FIG. 3, waiting at node 248 for the vorCheckDone parameter to be to set to true.

In response to the vorCheckDone parameter set to true, the flow of control transitions to node 250 with the pilot1Combined module sending a CheckAltimeter event. The pilotAltCheck1 module of FIG. 2H receives the CheckAltimeter event and proceeds as discussed above. Once the altimeter system check has been performed, an altimeterCheckDone parameter is set to true and transitions to node 244. Then, the flow of control returns to an altimeterCheckDone parameter is set to true and transitions to node 244. Then, the flow of control returns to pilot1Combined module of FIG. 3, waiting at node 250 for the altimeterCheckDone parameter to be to set to true. In response to the altimeterCheckDone parameter set to true, the flow of control transition to node 242, completing the hypothetical checklist of check items in a hypothetical aircraft through logical behavior defined in three behavior models.

The design and models discussed above is a single instantiation of formal representation of autonomy. This formal approach enables execution of queries or verification checks that exhaustively executes all the possible paths to guarantee that the behavior is valid or not violated. Queries are formulated and based upon the formal environment used for modeling. For example, the formal verification environment of UPPAAL may be used to guarantee that the APPU 120 responds to a faulty altimeter in all circumstances. The expected behavior may be written so that for all behaviors generated by the model, if the altimeter is faulty, the pilot responds to it. In this manner, formal analysis guarantees that the autonomous pilot will behave as expected at all times. The analysis thereby provides a path to verifiable autonomy that may be tested and certified, and accredited by an aviation-governing authority.

Although the preceding discussion of the behavior models has been drawn towards the performance of a checklist, the operations of aircraft systems that are expected of the aircraft systems to be in compliance with the checklist, and the behavior expected of a pilot performing the checklist, the behavior models may be based upon additional or alternative logical behavior that may not be covered in a checklist but expected of a pilot. For example, a pilot may be expected to fly in accordance with regulatory requirements established by an aviation-governing authority including those requirements that address emergency operations, and logical behavior models may be included to meet this expected behavior and other expected behaviors. In another example, a pilot may be expected to fly in accordance with standard practices and procedures other than regulatory requirements adapted by aviation-governing authority including those that address emergency operations, changing environments and the like. In another example, a pilot may be expected to fly in accordance with operator requirements established by an owner and/or operator of the aircraft including those that address emergency operations, changing environments and the like. In another example, a pilot may be expected to fly in accordance with operating procedures approved by a manufacturer of the aircraft such as pilot operating handbooks and/or checklists. It should be noted that the previous examples are provided for the purpose of illustration and not of limitation to illustrate one or more bases upon which logical behavior models may be defined.

Figure 4:
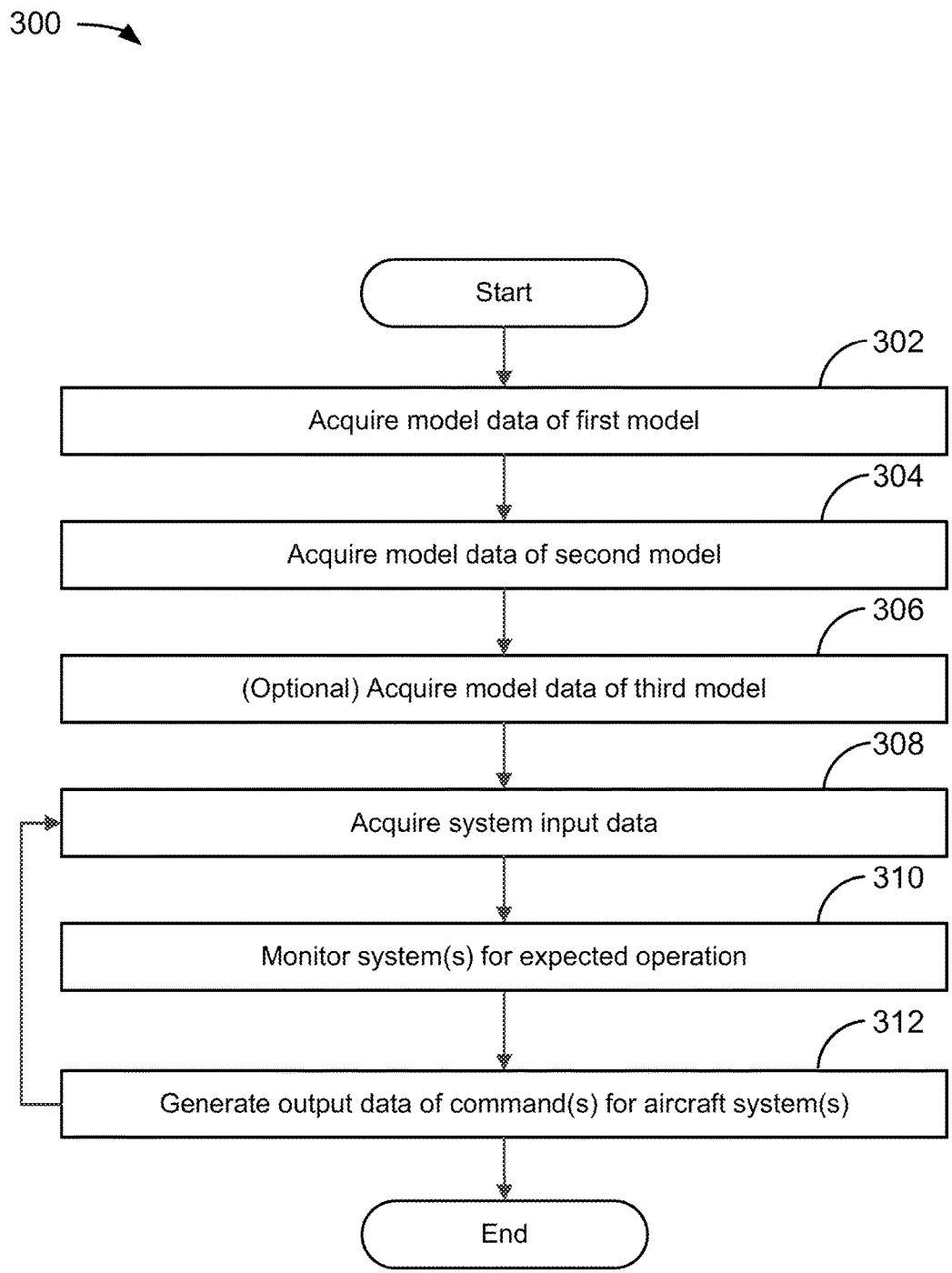
FIG. 4 illustrates a flowchart disclosing an embodiment of a method for operating an aircraft autonomously.

FIG. 4 depicts flowchart 300 providing an example for operating an aircraft autonomously, where the APPU 120 may be programmed or configured with instructions corresponding to the following modules that that are continuously executed throughout the aircraft operation. The APPU 120 may be a processor unit of a module such as, but not limited to, a printed circuit card assembly having one or more input interfaces (e.g., virtual or physical computer ports) to facilitate data communications with the APPU 120, i.e., the receiving and providing of data (e.g., one or more electrical or optical signals including data and/or being indicative of data). For the accomplishment of the following modules embodied in FIG. 4, the acquiring of data is synonymous and/or interchangeable with reading, receiving, and/or the retrieval of data.

The method of flowchart 300 begins with module 302 with the APPU 120 acquiring model data representative of a first model. In some embodiments, the first model may be a strategic behavior model defined by one or more first events and one or more first parameters. In other embodiments, the first model may be a strategic/operational behavior model also defined by one or more first events and one or more first parameters.

The method of flowchart 300 continues with module 304 with the APPU 120 acquiring model data representative of a second model. In the embodiments in which a strategic behavior model is employed, the second model may be an operational behavior model defined by one or more second events and one or more second parameters. In the embodiments in which a strategic/operational behavior model is employed, the second model may be an execution behavior model also defined by one or more second events and one or more second parameters.

The method of flowchart 300 continues with an optional module 306 with the APPU 120 acquiring model data representative of a third model. In the embodiments in which a strategic behavior model is employed, the third model may be an execution behavior model defined by one or more third events and one or more third parameters.

The method of flowchart 300 continues with module 306 with the APPU 120 acquiring input data representative of one or more system parameters associated with one or more aircraft systems. In the embodiments in which a strategic/operational behavior model is employed, the input data may be acquired via the second model. In some embodiments in which strategic and operational behavior models are employed, the input data may be acquired via the third model.

The method of flowchart 300 continues with module 308 with the APPU 120 monitoring the one or more aircraft systems for operations that are expected. In the embodiments in which a strategic/operational behavior model is employed, an association may exist between one or more system parameters and one or more second parameters. The expected operation of each aircraft system may be indicated by a correlation between one or more second parameters and one or more associated system parameters; that is, the expected operation of each aircraft system may be indicated by a correlation between one or more second parameters and one or more system parameters associated with the one or more second parameters.

In the embodiments in which strategic and operational behavior models are employed, the setting of each third parameter could be commensurable with one or more system parameters and subject to change in response to a change in one or more system parameters such that the each third parameter remains commensurate with the one or more system parameters. Also, the setting of each second parameter could be commensurable with one or more third parameters and subject to change in response to a change in the one or more third parameters such that the each second parameter remains commensurate with the one or more third parameters. Also, the setting of each first parameter could be commensurable with one or more second parameters and subject to change in response to a change in the one or more second parameters such that the each first parameter remains commensurate with the one or more second parameters.

The method of flowchart 300 continues with module 310 with the APPU 120 generating output data, where the output data may be representative of one or more commands provided to one or more aircraft systems. In the embodiments in which a strategic/operational behavior model is employed, the output data may be generated by the second model when a lack of correlation exists between one or more second parameters and one or more associated system parameters. Then, the method of flowchart 300 loops back to module 306.

It should be noted that the method steps described above may be embodied in computer-readable media stored in a non-transitory computer-readable medium as computer instruction code. It shall be appreciated to those skilled in the art that not all method steps described must be performed, nor must they be performed in the order stated.

As used herein, the term "embodiment" means an embodiment that serves to illustrate by way of example but not limitation.

It will be appreciated to those skilled in the art that the preceding examples and embodiments are exemplary and not limiting to the scope of the present invention. It is intended that all modifications, permutations, enhancements, equivalents, and improvements thereto that are apparent to those skilled in the art upon a reading of the specification and a study of the drawings are included within the true spirit and scope of the present invention. It is therefore intended that the following appended claims include all such modifications, permutations, enhancements, equivalents, and improvements falling within the true spirit and scope of the present invention.

What is claimed is:

1. A system for operating an aircraft autonomously, comprising:
a plurality of aircraft systems; and
an autonomous pilot processing unit configured to:
acquire first model data representative of a first behavior model comprised of at least one first parameter;
acquire second model data representative of a second behavior model comprised of at least one second parameter;
acquire input data representative of at least one aircraft system parameter from at least one of the plurality of aircraft systems, where the input data is acquired through the second behavior model, and the at least one second parameter is associated with at least one aircraft system parameter;
monitor the plurality of aircraft systems for expected operations, where the expected operation of each aircraft system is indicated by a correlation between the at least one second parameter and the at least one aircraft system parameter associated with the at least one second parameter;
generate output data representative of at least one command in response to a lack of correlation between at least one second parameter and at least one aircraft system parameter associated with the at least one second parameter; and
provide the output data to at least one aircraft system of the plurality of aircraft systems to control each aircraft system of the plurality of aircraft systems not operating according to its expected operation.

2. The system of claim 1, wherein at least the second behavior model is based upon an expected behavior of a pilot.

3. The system of claim 1, wherein
the expected operation of each aircraft system is an aircraft system operating in compliance with at least
regulatory requirements established by an aviation-governing authority,
standard practices and procedures other than regulatory requirements adapted by the aviation-governing authority,
operator requirements established by at least one of an owner of the aircraft and an operator of the aircraft,
operating procedures approved by a manufacturer of the aircraft, or
any combination of these.

4. The system of claim 1, wherein
the first behavior model is comprised of a strategic/operational behavior model, and the second behavior model is comprised of an execution behavior model.

5. The system of claim 1, wherein
the autonomous pilot processing unit is further configured to:
acquire third model data representative of a third behavior model defined by at least one third event, and at least one third parameter, where
the first behavior model is responsive to at least one third event, and
at least one third parameter is responsive to at least one first parameter of the first behavior model.

6. The system of claim 5, wherein
the third behavior model is based upon at least one checklist of the aircraft, and
the second behavior model is based upon an expected behavior of a pilot performing the at least one checklist of the aircraft.

7. The system of claim 5, wherein
the first behavior model is comprised of an operational behavior model, the second behavior model is comprised of an execution behavior model, and the third behavior model is comprised of a strategic behavior model.

8. A device for operating an aircraft autonomously, comprising:
an autonomous processing unit configured to:
acquire first model data representative of a first behavior model comprised of at least one first parameter;
acquire second model data representative of a second behavior model comprised of at least one second parameter;
acquire input data representative of at least one aircraft system parameter from at least one of the plurality of aircraft systems, where
the input data is acquired via the second behavior model, and
the at least one second parameter is associated with at least one aircraft system parameter;
monitor the plurality of aircraft systems for expected operations, where
the expected operation of each aircraft system is indicated by a correlation between the at least one second parameter and the at least one aircraft system parameter associated with the at least one second parameter;
generate output data representative of at least one command in response to a lack of correlation between at least one second parameter and at least one aircraft system parameter associated with the at least one second parameter; and
provide the output data to at least one aircraft system of the plurality of aircraft systems to control each aircraft system of the plurality of aircraft systems not operating according to its expected operation.

9. The device of claim 8, wherein at least the second behavior model is based upon an expected behavior of a pilot.

10. The device of claim 8, wherein
the expected operation of each aircraft system is an aircraft system operating in compliance with at least
regulatory requirements established by an aviation-governing authority,
standard practices and procedures other than regulatory requirements adapted by the aviation-governing authority,
operator requirements established by at least one of an owner of the aircraft and an operator of the aircraft,
operating procedures approved by a manufacturer of the aircraft, or
any combination of these.

11. The device of claim 8, wherein
the first behavior model is comprised of a strategic/operational behavior model, and the second behavior model is comprised of an execution behavior model.

12. The device of claim 8, wherein
the autonomous pilot processing unit is further configured to:
acquire third model data representative of a third behavior model defined by
at least one third event, and
at least one third parameter, where
the first behavior model is responsive to at least one third event, and
at least one third parameter is responsive to at least one first parameter of the first behavior model.

13. The device of claim 12, wherein
the third behavior model is based upon at least one checklist of the aircraft, and
the second behavior model is based upon an expected behavior of a pilot performing the at least one checklist of the aircraft.

14. The device of claim 12, wherein
the first behavior model is comprised of an operational behavior model,
the second behavior model is comprised of an execution behavior model, and
the third behavior model is comprised of a strategic behavior model.

15. A method for operating an aircraft autonomously, comprising:
acquiring, by an autonomous pilot processing unit, first model data representative of a first behavior model
acquiring second model data representative of a second behavior model comprised of at least one second parameter;
acquiring input data representative of at least one aircraft system parameter from at least one of a plurality of aircraft systems, where
the input data is acquired via the second behavior model, and
the at least one second parameter is associated with at least one aircraft system parameter;
monitoring the plurality of aircraft systems for expected operations, where
the expected operation of each aircraft system is indicated by a correlation between the at least one second parameter and the at least one aircraft system parameter associated with the at least one second parameter;
generating output data representative of at least one command in response to a lack of correlation between at least one second parameter and at least one aircraft system parameter associated with the at least one second parameter; and
providing the output data to at least one aircraft system of the plurality of aircraft systems to control each aircraft system of the plurality of aircraft systems not operating according to its expected operation.

16. The method of claim 15, wherein
at least the second behavior model is based upon an expected behavior of a pilot.

17. The method of claim 15, wherein
the expected operation of each aircraft system is an aircraft system operating in compliance with at least
regulatory requirements established by an aviation-governing authority,
standard practices and procedures other than regulatory requirements adapted by the aviation-governing authority,
operator requirements established by at least one of an owner of the aircraft and an operator of the aircraft,
operating procedures approved by a manufacturer of the aircraft, or
any combination of these.

18. The method of claim 15, wherein
the first behavior model is comprised of a strategic/operational behavior model, and the second behavior model is comprised of an execution behavior model.

19. The method of claim 15, further comprising:
acquiring third model data representative of a third behavior model defined by
at least one third event, and
at least one third parameter, where
the first behavior model is responsive to at least one third event, and
at least one third parameter is responsive to at least one first parameter of the first behavior model.

20. The method of claim 19, wherein
the first behavior model is comprised of an operational behavior model,
the second behavior model is comprised of an execution behavior model, and
based upon an expected behavior of a pilot performing the at least one checklist of the aircraft, and
the third behavior model is
comprised of a strategic behavior model, and
based upon at least one checklist of the aircraft.

* * * * *